(12) United States Patent
Chen et al.

(10) Patent No.: US 8,360,569 B2
(45) Date of Patent: Jan. 29, 2013

(54) PHOSPHATE-CONTAINING SURFACTANTS FOR USE WITH PIGMENT—AND LATEX-CONTAINING INK-JET INKS

(75) Inventors: Xiaohe Chen, San Diego, CA (US); John Morrow Gardner, San Diego, CA (US); Brian Douglas Mather, San Diego, CA (US); Yan Zhu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 12/808,036

(22) PCT Filed: Dec. 14, 2007

(86) PCT No.: PCT/US2007/025720
§ 371 (c)(1),
(2), (4) Date: Jun. 14, 2010

(87) PCT Pub. No.: WO2009/078833
PCT Pub. Date: Jun. 25, 2009

(65) Prior Publication Data
US 2010/0277526 A1   Nov. 4, 2010

(51) Int. Cl.
*G01D 11/00* (2006.01)

(52) U.S. Cl. .......... 347/100; 347/95; 106/31.6

(58) Field of Classification Search .......... 347/100, 347/95, 96, 101, 20, 21, 9, 88, 99; 106/31.6, 106/31.13, 31.27; 523/160, 161
See application file for complete search history.

(56) References Cited

U.S. PATENT DOCUMENTS

| 4,725,317 A | 2/1988 | Wheeler |
| 6,149,719 A | 11/2000 | Houle |
| 6,184,268 B1 | 2/2001 | Nichols et al. |
| 6,398,861 B1 | 6/2002 | Knox |
| 6,513,921 B1 | 2/2003 | Houle |
| 6,726,757 B2 | 5/2003 | Sarkisian et al. |
| 6,814,789 B2 * | 11/2004 | Uhlir-Tsang et al. ...... 106/31.35 |
| 2004/0118321 A1 * | 6/2004 | Fu et al. ..................... 106/31.58 |
| 2004/0157956 A1 | 8/2004 | Vincent et al. |
| 2004/0157958 A1 | 8/2004 | Vincent et al. |
| 2005/0031558 A1 | 2/2005 | Elder et al. |
| 2005/0155516 A1 * | 7/2005 | Hermansky ................... 347/100 |
| 2005/0225615 A1 | 10/2005 | Sader et al. |
| 2005/0231573 A1 | 10/2005 | Bruinsma et al. |
| 2005/0276774 A1 | 12/2005 | Elder et al. |
| 2006/0007287 A1 * | 1/2006 | Cagle et al. ................... 347/100 |
| 2006/0014856 A1 * | 1/2006 | McGorrin et al. ............ 523/160 |
| 2006/0087541 A1 | 4/2006 | Tsao |
| 2006/0092251 A1 | 5/2006 | Prasad et al. |
| 2007/0225400 A1 | 9/2007 | Schmid et al. |
| 2008/0171149 A1 * | 7/2008 | Hastie ........................... 427/288 |

FOREIGN PATENT DOCUMENTS

| EP | 1245588 | 10/2002 |
| EP | 1548040 | 6/2005 |
| EP | 1698674 | 9/2006 |
| JP | 200382265 | 3/2003 |
| JP | 18-257418 | 9/2006 |
| KR | 10-2005-0118712 | 12/2005 |

OTHER PUBLICATIONS

Search Report from International Searching Authority for PCT/US2007/025720 dated Aug. 26 2008.

* cited by examiner

*Primary Examiner* — Manish S Shah

(57) ABSTRACT

The present disclosure is drawn to an ink-jet ink and a method of ink-jet printing over a prolonged period of time. The ink-jet ink include from 0.1 wt % to 10 wt % pigment by solids, from 0.1 wt % to 15 wt % latex by solids, and from 0.01 wt % to 3 wt % phosphate-containing surfactant, wherein when the ink-jet ink is fired from a thermal ink-jet printhead at 400 million drops per nozzle with said nozzle having an orifice size of about 20 microns, at least 80% drop weight is retained compared to an initial firing prior to firing the 400 million drops per nozzle.

27 Claims, No Drawings

PHOSPHATE-CONTAINING SURFACTANTS FOR USE WITH PIGMENT—AND LATEX-CONTAINING INK-JET INKS

BACKGROUND

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, etc. As new ink-jet inks are developed, there have been several traditional characteristics to consider when evaluating the ink in conjunction with a printing surface or substrate. Such characteristics include edge acuity and optical density of the image on the surface, black to color bleed control, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

A few characteristics of ink-jet printing systems that are desirable to achieve are related to nozzle health, kogation, and ink throughput. With respect to this, obtaining acceptable print quality while retaining acceptable printing reliability and nozzle health is a constant challenge in the ink-jet printing industry. Accordingly, investigations continue into developing ink formulations that can be printed accurately and with acceptable durability without excessive clogging or orifice kogation.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used in this specification and the appended claims, the singular forms "a," "an," and "the" include plural referents unless the context clearly dictates otherwise. Thus, for example, reference to "an ink" includes one or more of such inks, reference to "a pigment" includes reference to one or more amounts of pigments, and reference to "the ink set" includes reference to one or more ink sets.

As used herein, "liquid vehicle" or "ink vehicle" refers to the liquid fluid in which colorant is dispersed or dissolved to form an ink. Liquid vehicles are well known in the art, and a wide variety of ink vehicles may be used in accordance with embodiments of the present invention. Such liquid vehicles may include a mixture of a variety of different agents, including without limitation, surfactants, organic co-solvents, buffers, biocides, viscosity modifiers, sequestering agents, stabilizing agents, and/or water. The liquid vehicle can also carry other additives such as latex particulates and other polymers, in some embodiments.

As used herein, "ink" refers to a single liquid vehicle that contains at least one colorant, and in accordance with embodiments of the present invention, certain inks will include a pigment and latex.

As used herein, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex is formulated within an ink, the liquid becomes part of the liquid vehicle of the ink, and thus, latex polymer can be described based on the latex particle or latex polymer solids that remain dispersed in the liquid vehicle. Latexes do not included polymers that are completely dissolved in a liquid vehicle.

As used herein, "pigment" refers to a colorant particle which is typically substantially insoluble in the liquid vehicle in which it is used. Pigments can be conventionally dispersed using a separate dispersing agent, or can be self-dispersed, having a dispersing agent attached to the surface of the pigment.

As used herein, "self-dispersed" generally refers to pigments that have been functionalized with a dispersing agent, such as by chemical attachment of the dispersing agent to the surface of the pigment. The dispersing agent can be a small molecule or a polymer or oligomer. The dispersing agent can be attached to such pigments to terminate the outer shell of the pigment with a charge, thereby creating a repulsive nature that reduces agglomeration of pigment particles within the liquid vehicle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

In accordance with this, it has been recognized that pigmented ink-jet inks which include latex particulates can clog internal ink channels, firing chambers, or nozzles, leading to resistor kogation due to starvation of the ink flow or impeded drop ejection, and that this phenomenon can be reduced by including a phosphate-containing surfactant in the ink-jet ink formulation. It has likewise been discovered that inks containing pigment and latex or other dispersed polymers tend to suffer from kogation of resistors due to buildup of polymeric binder or pigment on the resistor, resulting in shortened lifetime of the printhead and decreased print quality at earlier stages in the life of the printhead. The introduction of a phosphate-containing surfactant can ameliorate or even substantially eliminate clogging from polymer buildup at the printhead orifices and/or kogation of resistors from latex-containing inks arising from either process, thus extending the life of ink-jet pens in general (and particularly thermal ink-jet pens) which carry such inks. Without being bound by any particular theory, it is thought that the addition of a phosphate-containing surfactant induces particle-ink vehicle separation of the latex particulates from the liquid vehicle, a process normally seen only with certain pigment particles, and only during periods of non-ejection or low duty cycle when evaporation of water from nozzles can be significant. This separation prevents or reduces unwanted migration, enrichment, and destabilization of the latex particulates in the printhead nozzles, internal ink channels, or firing chambers, thus contributing to unimpeded drop ejection and the increased nozzle health observed when these surfactants are included. Alternatively or in conjunction with this, the phosphate-containing surfactant may directly interfere with deposition of polymeric or pigment particles that can form films on the thermal ink-jet resistor during unimpeded ink flow and firing, leading to kogation and reduced drop ejection quality.

Thus, an ink-jet ink can comprise from 0.1 wt % to 10 wt % pigment by solids, from 0.1 wt % to 15 wt % latex by solids, and from 0.01 wt % to 3 wt % phosphate-containing surfactant.

In another embodiment, a method of printing over a prolonged period of time with enhanced ink-jet architecture reliability can comprise jetting an ink-jet ink onto a media substrate. The ink-jet ink can comprise from 0.1 wt % to 10 wt % pigment by solids, from 0.1 wt % to 15 wt % latex by solids, and from 0.01 wt % to 3 wt % phosphate-containing surfactant. The jetting can be such that the ink does not substantially contribute to nozzle clogging and/or related resistor kogation.

Though this ink in each of these embodiments can be fired from a variety of different types of ink-jet architecture, as a definitional matter, when the ink-jet ink is fired from a thermal ink-jet printhead at 400 million drops per nozzle, at least 80% drop weight is often retained compared to an initial firing prior to firing the 400 million drops per nozzle. These measurements can be based on a printhead having an orifice size of about 20 microns (based on the longest distance across the orifice, such as diameter when the orifice has a circular shape), or alternatively, can be based on starting drop weights of about 11 ng to 12 ng. In another embodiment, when the ink-jet ink is fired from a thermal ink-jet printhead at 400 million drops per nozzle, at least 90% drop weight can be retained compared to an initial firing prior to firing the 400 million drops per nozzle. It is emphasized that these numbers and testing protocols are in no way limiting as to how the ink-jet inks of the present invention are to be fired or jetted. Rather, these numbers merely set forth testing protocols that one can use to determine whether an ink-jet ink meets the criteria set forth herein. For example, the inks of the present invention can be fired from thermal ink-jet architecture or piezo ink-jet architecture. Exemplary orifice sizes that are particularly useful include those ranging from 10 microns to 40 microns, though sizes outside of this range are also usable. Exemplary drop weights (when jetting) for the inks of the present disclosure can range from 2 ng to 40 ng, though drop weights outside of this range can also be used. Thus, the 20 micron orifice and/or the "about 11 ng to 12 ng" parameters set forth above are merely provided to set forth testing protocols to determine performance characteristics of ink-jet inks, as will be further exemplified in the Examples herein.

It is also noted that drop velocity change is also valuable in determining nozzle health in general. As such, in each of these embodiments, at least 75% drop velocity can be retained compared to the initial firing prior to firing the 400 million drops per nozzle; at least 80% drop velocity can be retained compared to the initial firing prior to firing the 400 million drops per nozzle; or often, at least 90% drop velocity can be retained compared to the initial firing prior to firing the 400 million drops per nozzle.

Though the testing conditions for the inks described herein were conducted using thermal ink-jet architecture having 20 micron-sized printing nozzles, other sizes of nozzles can be used, e.g., 5 microns to 100 microns, or from 10 microns to 40 microns. Also, various printing temperatures that are typical for thermal ink-jet architecture can also be used with acceptable results.

It is also noted that in each of these embodiments, the pigment content can alternatively be from 0.5 wt % to 5 wt %, the latex solids content can be from 2 wt % to 8 wt %, and/or the phosphate-containing surfactant content can be from 0.3 wt % to 1 wt %.

In accordance with the embodiments described herein, various details are provided herein which are applicable to each of the ink-jet ink or inks, method of printing, etc. Thus, discussion of one specific embodiment is related to and provides support for this discussion in the context of the other related embodiments.

Pigments

The pigments that can be used in accordance with embodiments of the present disclosure include both self-dispersed pigments as well as conventionally dispersed pigments, e.g., pigments dispersed by a separate dispersing agent that is not covalently attached to the surface. If self-dispersed, a dispersant is typically prepared in a precursor form, and then the precursor is attached to the pigment to chemically modify the surface of the pigment. In one embodiment, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example. Other precursors can also be used to attach to the pigment, as would be known by those skilled in the art.

As alluded to, pigment colorant can be used in accordance with embodiments of the present disclosure. Specifically, if black is used, the black pigment can be any commercially available black pigment that provides acceptable optical density and print characteristics. Such black pigments can be manufactured by a variety of known methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW S170, Printex including 95, 85, 75, 55, 45, 300, 35, 25, 200, 12, and Special Blacks including, 4A, 4, 5, 6, 550, 350, 250; BP1100, BP900, BP800, M1100, M900, M800, Monarch 1400, Monarch 1300, Monarch 1100, Monarch 1000, Monarch 900, Monarch 880, and Monarch 700; Cab-O-Jet 200 and Cab-O-Jet 300; Raven 2500ultra, Raven 2000, Raven 7000, Raven 5750, Raven 5250, Raven 5000, and Raven 3500; 45 B, and combinations thereof.

In addition to black, other pigment colorants can be used, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder, press cake, or dispersion form from a number of sources.

Typically, the pigments of the present invention can be from about 5 nm to about 10 µm, and in one aspect, the pigments can be from 10 nm to about 500 nm in size, although sizes outside this range can be used if the pigment can remain dispersed and provide adequate printing properties.

Latexes

Latexes include both latex particulates as well as the aqueous medium in which the latex particulates are dispersed. More specifically, a latex is a liquid suspension comprising a liquid (such as water and/or other liquids) and polymeric particulates from 20 nm to 500 nm (and often from 100 nm to 300 nm) in size. Typically, the polymeric particulate can be present in the liquid at from 0.5 wt % to 20 wt %, though final latex solids concentration in the ink is also relevant to the present disclosure. Such polymeric particulates can comprise a plurality of monomers that are typically randomly polymerized, and can also be crosslinked. Additionally, in one embodiment, the latex component can have a glass transition temperature from about −20° C. to +100° C.

Generally, any latex polymer commercially available can be used in the inks of the present disclosure including self-dispersed and functionalized latex polymers. Latex polymers can be prepared using any of a number of known emulsion polymerization techniques where co-monomers are dispersed and polymerized in a discontinuous phase of an emulsion. Monomers that are often used include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; and iso-octyl methacrylate.

The latexes used herein can be prepared by latex emulsion polymerization, and, in one embodiment, can have a weight average molecular weight from 10,000Mw to 5,000,000 Mw. This range is only exemplary and can be broader. Co-polymers can be formed, including block copolymers, randomly assembled copolymers, copolymers including crosslinkers, or the like. Often the copolymer is a randomly assembled copolymer, though various subclasses of each polymer type can be used, e.g., core-shell, various glass transition temperatures, surface acid groups, crosslinking, etc. It is noted that it is not the purpose of the present disclosure to describe all different types of latexes that can be used. Thus, the description of such latexes should not be considered limiting with respect to type of dispersed polymer that can be used.

It should be noted that the preparation of a latex, which includes the latex particulates and a liquid phase, and the preparation of an ink-jet ink that includes a latex, can be carried out in many different ways. In one embodiment, the liquid phase of the latex and a liquid vehicle of an ink can become admixed to form a modified liquid vehicle containing latex particulates and colorant. When the colorant is a self-dispersed or conventionally dispersed pigment, the total solids content of the latex particulates and pigments can be considered when determining relative amounts that should be present for jettability purposes.

Liquid Vehicles

In accordance with embodiments of the present disclosure, the liquid vehicle includes a phosphate-containing surfactant. Other ingredients that can be present include water, organic co-solvents, other surfactants, biocides, sequestering agents, etc. With respect to the phosphate-containing surfactant, the phosphate surfactant can be a phosphate ester of fatty alcohol alkoxylates. In one embodiment, the surfactant can be a mixture of mono- and diesters, and can optionally have an acid number from 50 to 150. In another embodiment, the phosphate-containing surfactant can be of the Crodafos family.

Specific examples include oleth-3 phosphate, oleth-10 phosphate, oleth-5 phospahte, dioleyl phosphate, ppg-5-ceteth-10phosphate, $C_9$-$C_{15}$ alkyl monophosphate, deceth-4 phosphate, and mixtures thereof. Other specific examples by tradename include Crodafos N3A, Crodafos N3E, Crodafos N10A, Crodafos HCE, Crodafos SG, Arlantone Map 950, Monofax 831, Monofas 1214, Monalube 215, and Atlox DP13/6.

In further detail with respect to the surfactant, the ink-jet ink compositions can be substantially free of surfactants other than the phosphate-containing surfactant. However, certain second surfactants can also be used and may include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, fluorosurfactants, and mixtures thereof. In one specific embodiment, a fluorosurfactant can be used as the second surfactant. In another embodiment, a secondary alcohol ethoxylated surfactant can be used. If used, the second surfactant can be present at from 0.001 wt % to 10 wt % of the ink-jet ink composition, and in one embodiment, can be present at from 0.001 wt % to 0.1 wt %.

In the ink-jet inks described herein, suitable co-solvents for use include water and water soluble organic co-solvents. Examples of such water soluble organic co-solvents include, but are not limited to, aliphatic alcohols, aromatic alcohols, diols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, Liponic ethoxylated glycerol 1 (EG-1), Liponic ethoxylated glycerol 7 (EG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, and derivatives thereof. Co-solvents can be added to reduce the rate of evaporation of water in the ink to minimize clogging or other properties of the ink such as viscosity, pH, surface tension, optical density, and print quality. The water soluble organic co-solvent total concentration can range from about 5 wt % to about 50 wt %. In one embodiment, when multiple co-solvents are used, each co-solvent can be typically present at from about 0.5 wt % to about 20 wt % of the ink-jet ink composition. This being said, the solvents may be present in the ink-jet ink composition at any concentration. In particular, the concentration of solvents such as 2-pyrrolidinone and its derivatives may play a role in helping the latex form a durable film on the vinyl media when used in conjunction with at least one secondary alcohol ethoxylate and at least one fluorosurfactant. In an embodiment, the ink-jet ink composition may comprise 2-pyrrolidinone or its derivatives in combination with a humectant solvent, such as 2-methyl-1,3,-propanediol. In other words, the ink-jet ink can comprise a liquid vehicle including a plurality of solvents, and included among the plurality of solvents can be from 10 wt % to 30 wt % of a solvent system consisting of one or more of 2-pyrrolidone, a derivative of 2-pyrrolidone, and a humectant, such as 2-methyl-1,3-propanediol.

Various buffering agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT, UCARCIDE, VANCIDE, PROXEL, and other known biocides. Typically, such biocides comprise less than about 5 wt % of the ink-jet ink composition and often from about 0.05 wt % to about 2 wt %.

Other known additives can also be included, as is known in the art.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Twelve ink-jet inks were prepared having the following general formulations:

TABLE 1a

| | Yellow Inks | | | |
|---|---|---|---|---|
| INGREDIENT | Y-L | Y-M | Y-H | Y-0 |
| Yellow pigment dispersion | 3 wt % | 3 wt % | 3 wt % | 3 wt % |
| 2-methyl-1,3-propanediol | 9 wt % | 9 wt % | 9 wt % | 9 wt % |
| 2-pyrrolidone | 16 wt % | 16 wt % | 16 wt % | 16 wt % |
| Fluorosurfactant | 1 wt % | 1 wt % | 1 wt % | 1 wt % |
| Secondary alcohol ethoxylate surfactant | 0.35 wt % | 0.35 wt % | 0.35 wt % | — |

TABLE 1a-continued

| Yellow Inks | | | | |
|---|---|---|---|---|
| INGREDIENT | Y-L | Y-M | Y-H | Y-0 |
| Phosphate-containing surfactant | 0.6 wt % | 0.75 wt % | 0.9 wt % | — |
| Latex dispersion | 6 wt % | 6 wt % | 6 wt % | 6 wt % |

TABLE 1b

| Cyan Inks | | | | |
|---|---|---|---|---|
| INGREDIENT | C-L | C-M | C-H | C-0 |
| Cyan pigment dispersion | 1.61 wt % | 1.61 wt % | 1.61 wt % | 1.61 wt % |
| 2-methyl-1,3-propanediol | 9 wt % | 9 wt % | 9 wt % | 9 wt % |
| 2-pyrrolidone | 16 wt % | 16 wt % | 16 wt % | 16 wt % |
| Fluoro-surfactant | 1 wt % | 1 wt % | 1 wt % | 1 wt % |
| Secondary alcohol ethoxylate surfactant | 0.35 wt % | 0.35 wt % | 0.35 wt % | — |
| Phosphate-containing surfactant | 0.6 wt % | 0.75 wt % | 0.9 wt % | — |
| Latex dispersion | 7 wt % | 7 wt % | 7 wt % | 7 wt % |

TABLE 1c

| Light Cyan Inks | | | | |
|---|---|---|---|---|
| INGREDIENT | LC-L | LC-M | LC-H | LC-0 |
| Cyan pigment dispersion | 0.54 wt % | 0.54 wt % | 0.54 wt % | 0.54 wt % |
| 2-methyl-1,3-propanediol | 9 wt % | 9 wt % | 9 wt % | 9 wt % |
| 2-pyrrolidone | 16 wt % | 16 wt % | 16 wt % | 16 wt % |
| Fluoro-surfactant | 1 wt % | 1 wt % | 1 wt % | 1 wt % |
| Secondary alcohol ethoxylate surfactant | 0.35 wt % | 0.35 wt % | 0.35 wt % | — |
| Phosphate-containing surfactant | 0.6 wt % | 0.75 wt % | 0.9 wt % | — |
| Latex dispersion | 4 wt % | 4 wt % | 4 wt % | 4 wt % |

As can be seen above, four inks included yellow pigment and latex (Yellow Ink), four inks included cyan pigment and latex (Cyan Ink), and four inks included a lower pigment load of cyan pigment and latex (Light Cyan Ink). Each of the four inks from each ink class included a different amount of a phosphate-containing surfactant, i.e. none, high, medium, or low. The coding for each ink color above is notated by Y for yellow, C for cyan, or LC for light cyan. Likewise, the coding for the amount of phosphate-containing in each ink is notated by 0 for no phosphate-containing, H for high concentration of phosphate-containing, M for a medium concentration of phosphate-containing, and L for a low concentration of phosphate-containing. It is noted that other colors can also benefit from the addition of phosphate-containing; and further, the notations of "high," "medium," and "low" are relative terms to this particular test, and thus, do not infer that higher amounts or lower amounts cannot be used.

Example 2

The 12 ink-jet inks were loaded into 12 different thermal ink-jet architectures and fired initially for baseline readings related to steady state drop weight (except for C-M, where reliable data was not collected on this particular run). Then, each ink was printed through its respective print architecture at 400 million drops per nozzle.

The nozzle size for this particular study was about 20 microns. The kogation performance was determined by measuring the drop weight and drop velocity retained after significant volume of ink firing. The kogation test was also carried out with multiple repeating pens for average result. After firing 400 million drops through each nozzle, drop weight and drop velocity data was collected. It is noted that media evaluations were conducted on Controltac media. The data is shown below in Table 2, as follows:

TABLE 2

| Ink-ID | Initial Steady State Drop Weight (ng)* | Drop Weight after 400 million Drops per Nozzle Fired (ng) | Drop Weight retained after 400 Million drops per Nozzle Fired (approx. %) | Initial Steady State Drop Velocity (m/s) | Drop Velocity after 400 Million Drops per Nozzle Fired (m/s) | Drop Velocity retained after 400 Million drops per Nozzle Fired (approx. %) |
|---|---|---|---|---|---|---|
| Y-0 | 11 | 6.6 | 60 | 12.1 | 9.8 | 81 |
| Y-H | 12.2 | 10.9 | 89 | 13.4 | 11.8 | 99 |
| Y-M | 11.7 | 11.5 | 98.3 | 13.6 | 12.5 | 92 |
| Y-L | 12 | 10.4 | 87 | 13.6 | 10.4 | 77 |
| C-0 | 11.3 | 4.7 | 42 | 12.8 | 11.5 | 90 |
| C-H | 11.6 | 11.3 | 97.4 | 12.5 | 12.2 | 98.6 |
| C-M | 11.5 | 11.1 | 96.5 | 12.8 | 12 | 94 |
| C-L | 11.5 | 11.2 | 97.4 | 12.7 | 11.6 | 91.3 |
| LC-0 | 10.8 | 8.3 | 77 | 12.4 | 8.8 | 71 |
| LC-H | 11.6 | 11.6 | 100 | 13.1 | 12.7 | 97 |
| LC-M | 11.5 | 11.4 | 99.2 | 13.2 | 12.9 | 97.7 |
| LC-L | 11.5 | 11.5 | 100 | 13.4 | 13 | 97 |

*All Initial Steady State Drop Weights in Table 2 are considered to be in the range of "about 11 ng to 12 ng."

As can be seen in the tables above, the presence of the phosphate-containing surfactant tended to lead to drop weight retention that was typically better than inks that did not include the phosphate-containing surfactant. Additionally, drop velocity tended to be improved (except for Y-L which was similar in result to Y-0) by the presence of the phosphate-containing surfactant. In addition to the data collected as described above, the ink-jet architecture was also visually inspected. It was confirmed visually that the ink-jet nozzles, in the absence of the phosphate-containing surfactant, tended to allow greater buildup of latex at the surface of the individual nozzles.

Example 3

Four inks were prepared in accordance with Table 3, as follows:

TABLE 3

| INGREDIENT | CYAN INK A | CYAN INK B | YELLOW INK A | YELLOW INK B |
|---|---|---|---|---|
| Pigment dispersion | 2.5 wt % | 2.5 wt % | 2.8 wt % | 2.8 wt % |
| Latex dispersion | 5 wt % | 5 wt % | 4.5 wt % | 4.5 wt % |
| Phosphate-containing surfactant | — | 1 wt % | — | 1 wt % |
| 2-pyrrolidone | 16 wt % | 16 wt % | 16 wt % | 16 wt % |
| 2-methyl-1,3-propanediol | 9 wt % | 9 wt % | 9 wt % | 9 wt % |
| Fluorosurfactant | 0.5 wt % | 0.5 wt % | 0.5 wt % | 0.5 wt % |
| pigment dispersant | 0.5 wt % | 0.5 wt % | — | — |

As can be seen in Table 3 above, two inks included conventionally dispersed cyan pigment and latex (Cyan Inks A and B), and two inks included self-dispersed yellow pigment and latex (Yellow Inks A and B). The "B" inks also included 1 wt % of a phosphate-containing surfactant.

Example 4

The four ink-jet inks were loaded into four different thermal ink-jet architecture devices and fired initially for baseline readings related to steady state drop weight and drop velocity. Then, each ink was printed through its respective print architecture after 400 million drops per nozzle were fired. The nozzle size for this particular study was about 20 microns. The kogation performance was determined by measuring the drop weight and drop velocity change. The kogation test can be carried out with multiple repeating pens for average result. After firing 400 million drops through each nozzle, drop weight and drop velocity data was collected. It is noted that media evaluations were conducted on Controltac media. The data is shown below in Table 4, as follows:

TABLE 4

| Ink ID | Drop weight retained after 400 Million Drops per Nozzle Fired (approx. %) | Drop Velocity retained after 400 Million Drops per Nozzle Fired (approx. %) |
|---|---|---|
| Cyan Ink B | 93 | 83 |
| Cyan Ink A | 51 | 52 |
| Yellow Ink B | 96 | 88 |
| Yellow Ink A | 79 | 71 |

As can be seen in Table 4 above, the presence of the phosphate-containing surfactant tended to lead to drop weight retention that was much better than inks that did not include the phosphate-containing surfactant. Additionally, drop velocity tended to be improved by the presence of the phosphate-containing surfactant. In addition to the data collected as described above, the ink-jet architecture was also visually inspected. It was confirmed visually that the ink-jet nozzles, in the absence of the phosphate-containing surfactant, tended to allow greater buildup of latex at the surface of the individual nozzles.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink, comprising:
   from 0.1 wt % to 10 wt % pigment by solids,
   from 0.1 wt % to 15 wt % latex by solids, and
   from 0.01 wt % to 3 wt % phosphate-containing surfactant,
   wherein when the ink-jet ink is fired from a thermal ink-jet printhead at 400 million drops per nozzle with said nozzle having an orifice size of about 20 microns, at least 80% drop weight is retained compared to an initial firing prior to firing the 400 million drops per nozzle.

2. The ink-jet ink of claim 1, wherein at least 75% drop velocity is retained compared to the initial firing prior to firing the 400 million drops per nozzle.

3. The ink-jet ink of claim 1, wherein at least 90% drop weight is retained compared to the initial firing prior to firing the 400 million drops per nozzle.

4. The ink-jet ink of claim 1, wherein when the ink-jet ink is fired from a thermal ink-jet printhead at 400 million drops per nozzle with said nozzle having an orifice size of about 20 microns, at least 90% drop velocity is retained compared to the initial firing prior to firing the 400 million drops per nozzle.

5. The ink-jet ink of claim 1, wherein when the ink-jet ink is fired from a thermal ink-jet printhead at 400 million drops per nozzle at a drop weight of about 11 ng to 12 ng, at least 80% drop weight is retained compared to an initial firing prior to firing the 400 million drops per nozzle.

6. The ink-jet ink of claim 1, further comprising a second surfactant.

7. The ink-jet ink of claim 6, wherein the second surfactant is a fluorosurfactant.

8. The ink-jet ink of claim 6, wherein the second surfactant is an ethoxylated surfactant.

9. The ink-jet ink of claim 1, further comprising at least one of 2-pyrrolidone, derivatives of 2-pyrrolidone, and 2-methyl-1,3-propanediol.

10. The ink-jet ink of claim 9, wherein the ink-jet ink comprises a liquid vehicle including a plurality of solvents, and included among the plurality of solvents is from 10 wt % to 30 wt % of a solvent system consisting of one or more of 2-pyrrolidone, a derivative of 2-pyrrolidone, and a humectant solvent.

11. The ink-jet ink of claim 10, wherein the humectant solvent is present and is 2-methyl-1,3-propanediol.

12. The ink-jet ink of claim 1, wherein the pigment is a self-dispersed pigment.

13. The ink-jet ink of claim 1, wherein the phosphate-containing surfactant is present at from 0.1 wt % to 2 wt %.

14. The ink-jet ink of claim 1, wherein the phosphate-containing surfactant is a phosphate ester of a fatty alcohol alkoxylate.

15. The ink-jet ink of claim 14, wherein the phosphate ester of a fatty alcohol alkoxylate is a mixture of mono- and di-esters.

16. The ink-jet ink of claim 1, wherein the phosphate-containing surfactant is selected from the group consisting of oleth-3 phosphate, oleth 10 phosphate, oleth-5 phospahte, dioleyl phosphate, ppg-5-ceteth-10 phosphate, $C_9$-$C_{15}$ alkyl monophosphate, deceth-4 phosphate, and mixtures thereof.

17. The ink-jet ink of claim 1, wherein the pigment is present at from 0.5 wt % to 5 wt % by solids, and the latex is present at from 2 wt % to 8 wt % by solids.

18. A method of ink-jet printing over a prolonged period of time, comprising jetting an ink-jet ink onto a media substrate, said ink-jet ink, including:
   from 0.1 wt % to 10 wt % pigment by solids,
   from 0.1 wt % to 15 wt % latex by solids, and
   from 0.01 wt % to 3 wt % phosphate-containing surfactant,
   wherein when the ink-jet ink is fired from a thermal ink-jet printhead at 400 million drops per nozzle with said nozzle having an orifice size of about 20 microns, at least 80% drop weight is retained compared to an initial firing prior to firing the 400 million drops per nozzle.

19. The method of claim 18, wherein at least 75% drop velocity is retained compared to the initial firing prior to firing the 400 million drops per nozzle.

20. The method of claim 18, wherein the ink-jet ink is fired from a thermal ink-jet printhead at 400 million drops per nozzle at a drop weight of about 11 ng to 12 ng, at least 80% drop weight is retained compared to an initial firing prior to firing the 400 million drops per nozzle, and wherein at least 75% drop velocity is retained compared to the initial firing prior to firing the 400 million drops per nozzle.

21. The method of claim 18, wherein the ink-jet ink further comprises a second surfactant.

22. The method of claim 21, wherein the second surfactant comprises at least one of fluorosurfactant or an ethoxylated surfactant.

23. The method of claim 18, wherein the phosphate-containing surfactant is a phosphate ester of a fatty alcohol alkoxylate.

24. The method of claim 22, wherein the phosphate ester of a fatty alcohol alkoxylate is a mixture of mono- and di-esters.

25. The method of claim 18, wherein the phosphate-containing surfactant is selected from the group consisting of oleth-3 phosphate, oleth 10 phosphate, oleth-5 phospahte, dioleyl phosphate, ppg-5-ceteth-10 phosphate, $C_9$-$C_{15}$ alkyl monophosphate, deceth-4 phosphate, and mixtures thereof.

26. The method of claim 18, wherein the ink-jet ink comprises a liquid vehicle including a plurality of solvents, and included among the plurality of solvents is from 10 wt % to 30 wt % of a solvent system consisting of one or more of 2-pyrrolidone, a derivative of 2-pyrrolidone, and a humectant solvent.

27. The method of claim 26, wherein the humectant solvent is present and is 2- methyl -1,3-propanediol.

* * * * *

UNITED STATES PATENT AND TRADEMARK OFFICE
CERTIFICATE OF CORRECTION

PATENT NO. : 8,360,569 B2  Page 1 of 1
APPLICATION NO. : 12/808036
DATED : January 29, 2013
INVENTOR(S) : Xiaohe Chen et al.

It is certified that error appears in the above-identified patent and that said Letters Patent is hereby corrected as shown below:

Title Page, Item (54) and in the specification, column 1, line 2, Title, delete "PIGMENT—AND" and insert -- PIGMENT- AND --, therefor.

In the Claims

In column 13, line 6, in Claim 16, delete "oleth 10" and insert -- oleth-10 --, therefor.

In column 13, line 6, in Claim 16, delete "phospahte," and insert -- phosphate, --, therefor.

In column 13, line 26, in Claim 20, delete "wherein" and insert -- wherein when --, therefor.

In column 14, line 17, in Claim 25, delete "oleth 10" and insert -- oleth-10 --, therefor.

In column 14, line 17, in Claim 25, delete "phospahte," and insert -- phosphate, --, therefor.

In column 14, line 27, in Claim 27, delete "2- methyl -1,3-propanediol." and insert -- 2-methyl-1,3-propanediol. --, therefor.

Signed and Sealed this
Sixteenth Day of July, 2013

Teresa Stanek Rea
*Acting Director of the United States Patent and Trademark Office*